(12) United States Patent
Aoki et al.

(10) Patent No.: US 9,004,657 B2
(45) Date of Patent: Apr. 14, 2015

(54) LIQUID CONTAINER, LIQUID CONTAINER SET, AND INK JET RECORDING APPARATUS

(71) Applicant: Seiko Epson Corporation, Tokyo (JP)

(72) Inventors: Katsuko Aoki, Kiso (JP); Tsuyoshi Sano, Shiojiri (JP); Yuji Aoki, Matsumoto (JP); Ippei Okuda, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/754,302

(22) Filed: Jan. 30, 2013

(65) Prior Publication Data

US 2013/0201260 A1    Aug. 8, 2013

(30) Foreign Application Priority Data

Feb. 6, 2012    (JP) ................................. 2012-022933

(51) Int. Cl.
*B41J 2/175*    (2006.01)
*G01D 11/00*    (2006.01)
*B65D 25/14*    (2006.01)
*B41J 2/21*     (2006.01)
*C09D 11/322*   (2014.01)
*C09D 11/40*    (2014.01)

(52) U.S. Cl.
CPC ............... *B41J 2/175* (2013.01); *B65D 25/14* (2013.01); *B41J 2/17503* (2013.01); *B41J 2/2103* (2013.01); *C09D 11/322* (2013.01); *C09D 11/40* (2013.01)

(58) Field of Classification Search
USPC ................. 347/85, 86, 87, 100; 523/160, 161
See application file for complete search history.

(56) References Cited

U.S. PATENT DOCUMENTS

| | | | | |
|---|---|---|---|---|
| 5,400,066 | A  * | 3/1995  | Matsumoto et al. | 347/86 |
| 5,854,307 | A  * | 12/1998 | Kimura et al.   | 523/161 |
| 6,227,661 | B1 * | 5/2001  | Hayakawa        | 347/86 |
| 6,834,945 | B2 * | 12/2004 | Ishizawa et al. | 347/86 |
| 7,393,089 | B2 * | 7/2008  | Yamaguchi et al.| 347/85 |
| 7,997,703 | B2 * | 8/2011  | Naka et al.     | 347/86 |
| 8,222,319 | B2 * | 7/2012  | Sano et al.     | 523/160 |
| 2007/0242114 | A1 | 10/2007 | Kubota et al.   | |

FOREIGN PATENT DOCUMENTS

| | | | | |
|---|---|---|---|---|
| JP | 2000063720   | * | 2/2000  | B41J 2/175 |
| JP | 02003080712  | * | 3/2003  | B41J 2/05  |
| JP | 2006-001240  |   | 1/2006  |            |
| JP | 2011-235506  |   | 11/2011 |            |

* cited by examiner

*Primary Examiner* — Anh T. N. Vo

(74) *Attorney, Agent, or Firm* — Harness, Dickey & Pierce, P.L.C.

(57) ABSTRACT

A liquid container detachably mounted on a liquid consuming apparatus includes: a liquid including dispersed particles and a solvent in which the dispersed particles are dispersed; and an accommodation bag accommodating the liquid and provided with a discharge portion discharging the liquid, in which a ratio of a volume of the liquid with respect to a capacity of the accommodation bag when the accommodation bag is used from an initial period of filling is 95% or less.

21 Claims, 7 Drawing Sheets

SEAL PORTION

SEAL PORTION

SEAL PORTION

SEAL PORTION

LIQUID CONTAINER, LIQUID CONTAINER SET, AND INK JET RECORDING APPARATUS

Priority is claimed under 35 U.S.C. §119 to Japanese Application No. 2012-022933 filed on Feb. 6, 2012, which is hereby incorporated by reference in its entirety.

BACKGROUND

1. Technical Field

The present invention relates to a liquid container, a liquid container set, and an ink jet recording apparatus.

2. Related Art

In general, inks in which dispersed particles of pigments or the like are uniformly dispersed and mixed in a solvent are widely used as inks used in ink jet recording apparatuses. In such inks, when left to stand for a long period of time, there is a tendency for the dispersed particles with a high density (heavy) in comparison with the solvent to be deposited. The deposition of the dispersed particles leads to a decrease in recording quality, such as ejection defects or the like due to color unevenness during recording or ink clogging in the recording apparatus. Therefore, for example, in a case of a recording apparatus using an ink cartridge as the liquid container, in order to re-disperse the deposited dispersed particles in the inner portion of the ink cartridge, methods such as shaking the ink cartridge and stirring the ink have been adopted. However, in a sealed type ink cartridge which does not include an air layer in the inner portion, there are problems in that ink convection does not easily occur, and it is not possible to effectively perform stirring. In relation to this, various ink stirring methods and techniques providing a stirring mechanism have been proposed. For example, in JP-A-2006-1240, there is proposed a technique of performing stirring by inserting a stirring ball inside the ink cartridge.

However, with the above-described technique of performing stirring by inserting a stirring ball inside the ink cartridge, in order to be able to effectively perform stirring in a short time by moving the stirring ball around thoroughly, there is a need to insert a sufficient number of stirring balls or to insert stirring balls having a sufficient size and weight. As a result, in particular, in a case where the ink cartridge is large, the volume occupied by the stirring balls, the weight, the necessary costs, and the like cannot be ignored. In other words, in the techniques of the related art, since there was a need to provide incidental objects which are not directly related to recording in the inner portion of the ink cartridge, there was a problem in that the reduction of recording costs was prevented.

SUMMARY

The invention can be realized in the following forms or application examples.

Application Example 1

According to the present Application Example, there is provided a liquid container detachably mounted on a liquid consuming apparatus, including: a liquid including dispersed particles and a solvent in which the dispersed particles are dispersed; and an accommodation bag accommodating the liquid and provided with a discharge portion discharging the liquid, in which a ratio of a volume of the liquid with respect to the capacity of the accommodation bag when the accommodation bag is used from an initial period of filling is 95% or less, and the dispersed particles are a glitter pigment or metal oxide.

According to the present Application Example, since the ratio of the volume of the liquid including the dispersed particles with respect to the capacity of the accommodation bag is 95% or less, it is possible to easily cause convection of the liquid in the inner portion in a case where the liquid container is rocked before performing attachment to the liquid consuming apparatus or when performing detachment from the liquid consuming apparatus. In addition, more preferably, by setting the ratio to 90% or less, it is possible to more effectively disperse the dispersed particles, which tend to be deposited, in the solvent.

On the other hand, in a case where the liquid is filled in an amount exceeding 95% with respect to the capacity of the accommodation bag, or is completely filled therein, since it is not possible to cause sufficient convection of the liquid in the inner portion even when the liquid container is rocked, a need arises to provide a member promoting convection in the inner portion of the accommodation bag.

Accordingly, according to the present Application Example, even with a sealed liquid container which does not include an air layer in the inner portion, it is possible to perform stirring without providing a stirring ball or the like, and it is possible to provide a liquid container in which costs are further reduced.

Application Example 2

In the liquid container according to the above-described Application Example, the weight (specific gravity×volume) of the dispersed particles is 10 µg or more.

In the present Application Example, for example, in a case where the liquid consuming apparatus is an ink jet type recording apparatus or the like recording glitter images or images with high brightness, the dispersed particles included in the liquid preferably have a weight (specific gravity×volume) of 10 µg or more. According to the present Application Example, even with a liquid container used for such purposes, it is possible to perform stirring without providing a stirring ball or the like, and it is possible to provide a liquid container in which costs are further reduced.

Application Example 3

In the liquid container according to the above-described Application Example, the accommodation bag is a pillow type packaging bag.

In the present Application Example, the accommodation bag is preferably a pillow type packaging bag. In the case of a pillow type packaging bag, since there are no folded portions configuring wedges as seen in gusset type packaging bags or the like, the deposited dispersed particles do not enter into the folded gaps. Accordingly, by causing convection of the liquid, it is possible to more easily disperse the dispersed particles, which tend to be deposited, in the solvent.

Application Example 4

In the liquid container according to the above-described Application Example, in a case of being mounted on at least the liquid consuming apparatus, a pressing mechanism which presses the accommodation bag and moves the liquid in a direction of a region where the discharge portion is provided is further provided.

In the present Application Example, in a case of being mounted on at least the liquid consuming apparatus, a pressing mechanism which presses the accommodation bag and moves the liquid in the direction of the region where the discharge portion is provided is preferably further provided. By providing such a pressing mechanism, it is possible to move the remaining liquid in the direction of a region where the discharge portion is provided as the liquid consuming apparatus consumes liquid and the liquid in the inner portion of the accommodation bag is reduced. As a result, the dispersed particles, which tend to be deposited, remaining in the portion separated from the region in which the discharge portion is provided inside the packaging bag are reduced. In addition, in a case of stirring by detaching the liquid container from the liquid consuming apparatus and rocking the liquid container, since the dispersed particles are not deposited across a wide range, it is possible to more easily disperse the deposited dispersed particles.

Application Example 5

In the liquid container according to the above-described Application Example, the discharge portion is provided with a liquid suction port through which liquid is introduced from the accommodation bag, and a liquid discharge port from which the introduced liquid is derived, in which, in a case of being mounted on the liquid consuming apparatus installed in an activatable state, the height of the liquid suction port is arranged to be at a lower position in the vertical direction than the height of the liquid discharge port.

In the present Application Example, in a case where the liquid container is mounted on the liquid consuming apparatus installed in an activatable state, the height of the liquid suction port provided in the discharge portion is preferably arranged to be at a lower position in the vertical direction than the height of the liquid discharge port. For example, even in a case where the height of the liquid discharge port needs to be installed at a high position in a specific range, by installing the height of the liquid suction port at a lower position, it is possible to supply the liquid appropriately including the dispersed particles, which tend to be deposited, to the liquid consuming apparatus. As a result, the gradual increasing of the density of the dispersed particles remaining inside the accommodation bag is reduced, and it is possible to maintain a more stable density.

Application Example 6

In the liquid container according to the above-described Application Example, a holder accommodating the accommodation bag in the inner portion thereof is further provided, in which the holder has a gap in which the accommodation bag is capable of moving or deforming in the inner portion of the holder, in a case of being detached from at least the liquid consuming apparatus.

In the present Application Example, a holder accommodating the accommodation bag in the inner portion thereof preferably has a gap in which the accommodation bag is capable of moving or deforming in the inner portion of the holder, in a case of being detached from at least the liquid consuming apparatus. By adopting such a configuration, the prevention of the movement of the accommodation bag in a case where the liquid container is detached from the liquid consuming apparatus and rocked is reduced, and it is possible to more easily cause convection of the liquid accommodated in the inner portion. As a result, it is possible to more effectively disperse the dispersed particles, which tend to be deposited, in the solvent.

Application Example 7

In the liquid container according to the above-described Application Example, the holder has a substantially rectangular parallelepiped shape, and an accommodation unit to be accommodated in the inner portion of the holder is not fixed to at least one face in the five side surfaces other than the side surface in which the discharge portion is positioned.

In the present Application Example, for the holder having the substantially rectangular parallelepiped shape, the accommodation unit to be accommodated in the inner portion of the holder is preferably not fixed to at least one face in the five side surfaces other than the side surface in which the discharge portion is positioned. There is a case where the accommodation bag having flexibility is deformed when the remaining amount of the liquid is reduced, irregularities are generated on the bottom portion, and the stirring of the dispersed particles deposited on the bottom portion is prevented. Accordingly, there is a need to partially fix the accommodation bag so as not to deform in such a manner. However, when the accommodation bag to be accommodated in the holder is fixed to all the side surfaces of the holder in the periphery relative thereto, even when the liquid container is rocked, deformation of the accommodation bag is prevented and it is no longer possible to cause sufficient convection of the liquid in the inner portion. Thus, in the present Application Example, by adopting a configuration in which the accommodation unit to be accommodated in the inner portion of the holder is not fixed to at least one face, the necessary sufficient deformation of the accommodation bag is promoted according to the rocking, and it becomes possible to more easily cause convection of the liquid accommodated in the inner portion.

Application Example 8

According to the present Application Example, there is provided a liquid container set including: the liquid container according to the above-described Application Example; and a color liquid container, in which the color liquid container is provided with a color liquid which does not include the dispersed particles and a color liquid accommodation bag accommodating the color liquid, and in which a ratio of the volume of the color liquid with respect to the capacity of the color liquid accommodation bag is higher than a ratio of the volume of the liquid with respect to the capacity of the accommodation bag.

In the present Application Example, in a case of the liquid container set including the liquid container according to the above-described Application Example and the color liquid container accommodating the color liquid which does not include the dispersed particles, the ratio of the volume of the color liquid with respect to the capacity of the color liquid accommodation bag is preferably higher than the ratio of the volume of the liquid with respect to the capacity of the accommodation bag. In the case of the color liquid which does not include the dispersed particles, since there is no need for concern about the deposition such as with the dispersed particles, there is no need to improve the convection property when stirring by rocking until the filling rate goes down. By further increasing the filling rate, it is possible to further reduce the replacement frequency of the color liquid container. In addition, due to the high density of the dispersed particles, the weight of the liquid including the dispersed particles tends to become heavier than the weight of the same amount of the color liquid; however, by raising the filling rate of the color liquid, it is possible to achieve a weight balance between the liquid container accommodating the liquid including the dispersed particles and the color liquid container accommodating the color liquid. As a state where the weight balance is easier to achieve, having the ratio of the volume of the liquid including the dispersed particles with respect to the capacity of the accommodation bag at 70% or more is more preferable.

Application Example 9

According to the present Application Example, there is provided an ink jet type recording apparatus including the liquid container or the liquid container set according to the above-described Application Examples.

In the present Application Example, the ink jet type recording apparatus provided with the liquid container or the liquid container set according to the above-described Application Examples can be provided as a more effective recording apparatus having excellent characteristics. Specifically, in a case where the liquid container is rocked before performing attachment to the ink jet type recording apparatus or after performing detachment from the ink jet type recording apparatus, it is possible to easily cause convection in the ink in the inner portion. As a result, it is possible to more effectively disperse the dispersed particles, which tend to be deposited, in the solvent and it is possible to perform recording without a decrease in recording quality, such as ejection defects or the like due to color unevenness during recording or ink clogging in the ink jet type recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, specific embodiments of the invention will be described with reference to the drawings. The following is one embodiment of the invention; however, the invention is not limited thereto. Here, in each of the following diagrams, for convenience of description, there are cases where the scale used in the description is different from that actually used. In addition, there are cases where mutually intersecting X, Y, and Z axes are appended. The directions of the respective axes are common to each drawing.

Embodiment 1

First, description will be given of an ink cartridge 100 as an example of a liquid container according to Embodiment 1.

Figure 1:
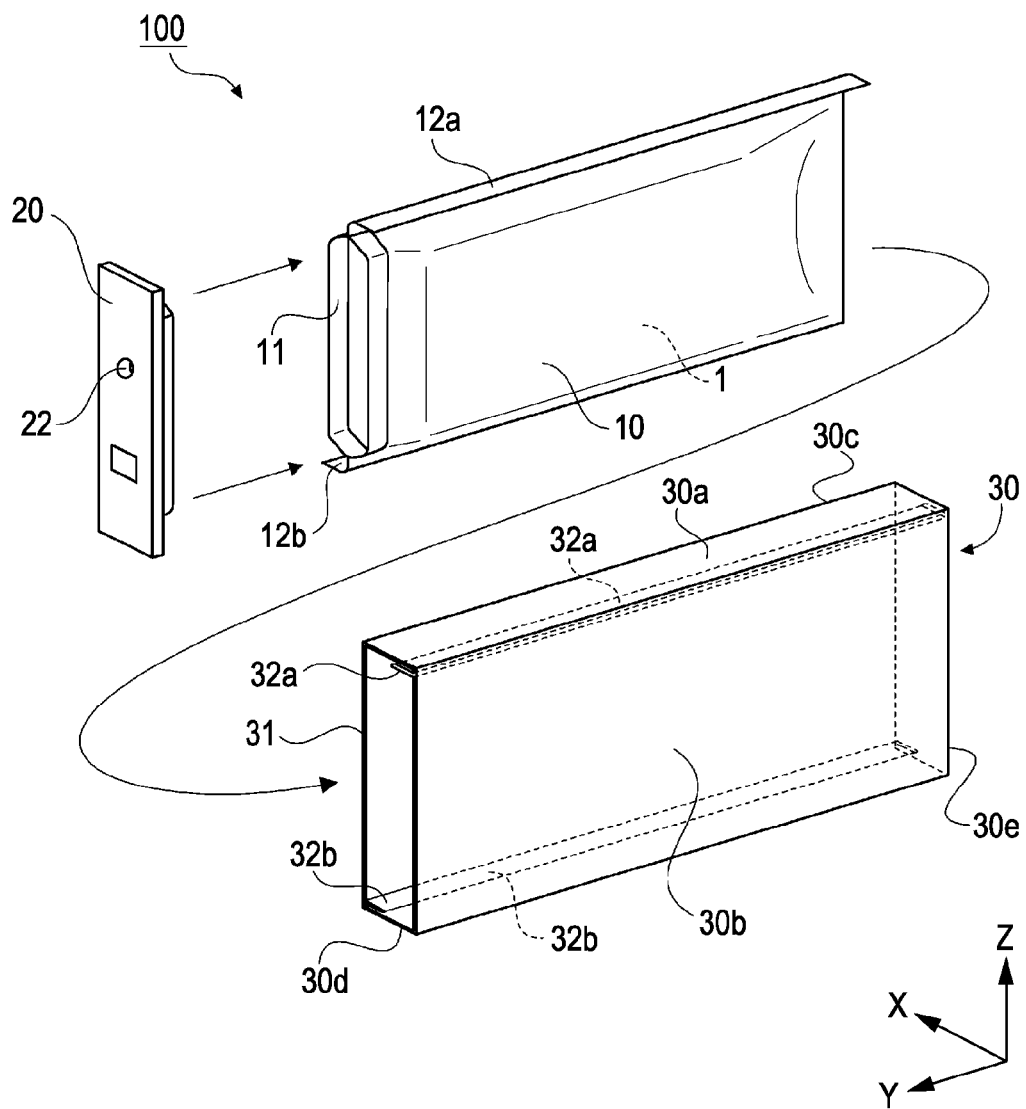
FIG. 1 is an oblique perspective view showing a configuration of an ink cartridge as a liquid container according to Embodiment 1.

FIG. 1 is an oblique perspective view showing a configuration of the ink cartridge 100.

In FIG. 1, the Z axis is the vertical direction, the Y axis is the direction along the longitudinal direction of the ink cartridge 100, and the X axis is the horizontal direction intersecting with the Z axis and the Y axis, respectively. In addition, the Z axis+direction is set to the upward direction.

The ink cartridge 100 is a liquid container detachably mounted on the ink jet type recording apparatus as the liquid consuming apparatus and having a flat, substantially rectangular parallelepiped shape, and is configured by an ink 1 as the liquid, an ink pack 10 as the accommodation bag, a flow channel member 20 configuring a discharge portion, a holder 30, and the like. As shown in FIG. 1, the ink cartridge 100 is mounted on the ink jet type recording apparatus installed in an activatable state such that the longitudinal direction of a rectangular side surface configuring a flat face of the ink cartridge 100 faces the horizontal direction and stands in the vertical direction.

The ink 1 is an ink for recording including dispersed particles at a predetermined concentration, and is configured according to the purpose thereof by various dispersed particles, various additives, and a solvent dispersing the dispersed particles. In the dispersed particles, it is preferable to use at least one type or more of dispersed particles selected from glitter pigments, metal oxides, and the like. In addition, the weight (specific gravity×volume) of the dispersed particles is preferably 10 μg or more.

Examples of the pigments of the dispersed particles include glitter pigments, for example, metal particles such as aluminum, silver, gold, platinum, nickel, chromium, tin, zinc, indium, titanium, and copper, or pigments having pearlescence or interference gloss such as mica-coated titanium dioxide, argentine, and bismuth acid chloride.

The glitter pigments are pigments having an extremely high specific gravity and are pigments for which a deposition phenomenon easily occurs in a liquid.

Examples of the metal oxides of the dispersed particles include metal oxide particles such as titanium dioxide, zinc oxide, silica, alumina, magnesium oxide, zirconium oxide, and the like. The metal oxides are pigments having an extremely high specific gravity and are pigments for which a deposition phenomenon easily occurs in a liquid.

Examples of other dispersed particles include carbon black, insoluble azo pigments, condensed azo pigments, azo lake, azo pigments such as chelate azo pigments, phthalocyanine pigments, perylene and perinone pigments, anthraquinone pigments, quinacridone pigments, dioxane pigments, thioindigo pigments, isoindolinone pigments, polycyclic pigments such as quinophthalone pigments, nitro pigments, nitroso pigments, resin particles having a hollow structure, and the like. In addition, these pigments may be commercially available pigments. Examples of commercially available pigments include yellow organic pigments, magenta organic pigments, cyan organic pigments, and the like.

Examples of the commercially available products for the yellow organic pigments include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, 213, and the like.

Examples of the magenta organic pigments include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, or C. I. Pigment Violet 19, 23, 32, 33, 36, 38, 43, 50, or the like.

Examples of the cyan organic pigments include C. I. Pigment Blue 1, 2, 3, 15, 15:1, 15:2, 15:3, 15:4, 15:6, 15:34, 16, 18, 22, 25, 60, 65, 66, C. I. Vat Blue 4, 60, and the like.

In addition, examples of organic pigments other than magenta, cyan, and yellow include C. I. Pigment Green 7, 10, C. I. Pigment Brown 3, 5, 25, 26, C. I. Pigment Orange 2, 5, 7, 13, 14, 15, 16, 24, 34, 36, 38, 40, 43, 63, and the like.

Even for pigments having a small specific gravity, a deposition phenomenon that cannot be ignored is generated in a case where the average particle diameter is large, as determined by the Stokes equation. Thus, the invention is preferably applied to such pigments.

Here, the weight of the dispersed particles in the invention is the specific gravity of the dispersed particles multiplied by the size of the dispersed particles. In a case where the dispersed particles are spherical, the size of dispersed particles is determined by measuring the average particle diameter and calculating the average particle diameter. The average particle diameter is the average particle diameter on a volume basis, and can be measured by a particle size distribution measuring apparatus using the laser diffraction scattering method as the measuring principle. Examples of the particle size distribution measuring apparatus include particle size distribution meters using the laser diffraction scattering method as the measuring principle.

Examples of particle diameter distribution measuring apparatuses include Microtrac UPA, Nanotrac UPA-EX150, (both manufactured by Nikkiso, Co., Ltd.), ELSZ-2, DLS-8000 (manufactured by Otsuka Electronics Co., Ltd.), LB-550 (manufactured by Horiba Co., Ltd.), and the like.

The ink pack 10 is an accommodation bag accommodating the ink 1 in the inner portion thereof, and is preferably a pillow type packaging bag.

Figure 2A:
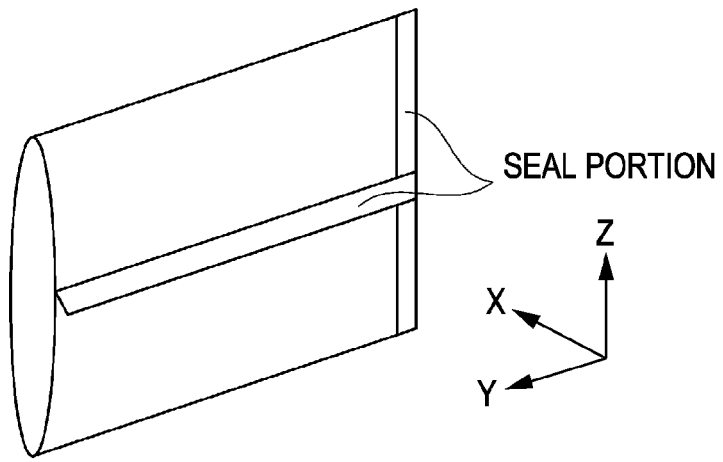
FIGS. 2A, 2B, and 2C are oblique perspective views showing an example of a pillow type packaging bag.
Figure 2B:
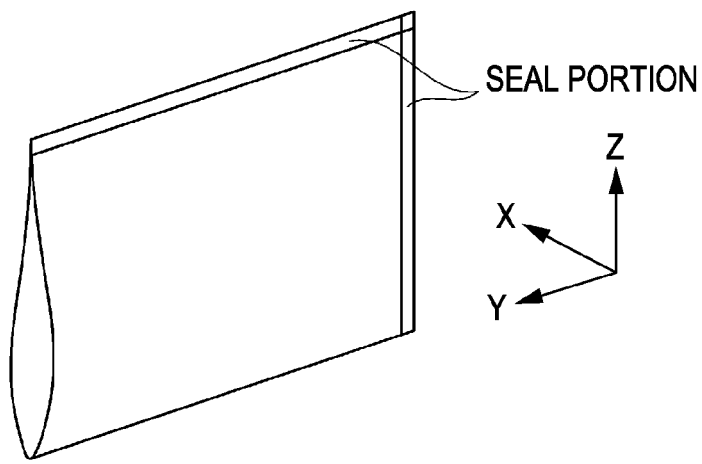
Figure 2C:
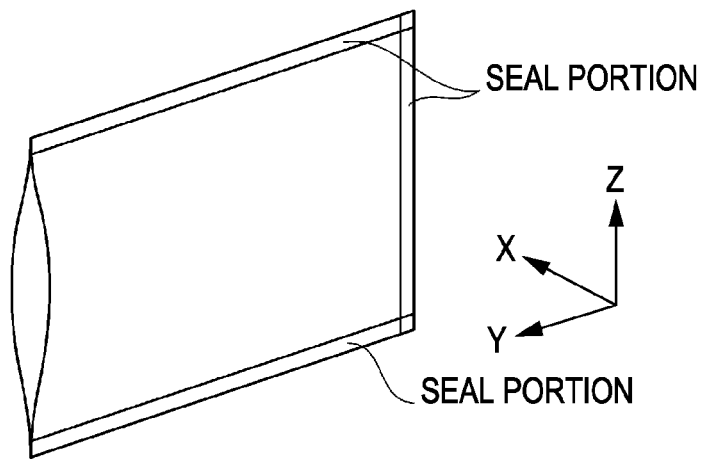

FIGS. 2A, 2B, and 2C are oblique perspective views showing an example of a pillow type packaging bag. In general, as shown in FIG. 2A, the pillow type packaging bag is a bag having a shape in which a piece of film is sealed back-to-back to form a tube, and in which the bottom portion (Y direction in FIG. 2A) is melted and cut off at a desired length. The pillow type packaging bag in the invention is a bag having no folded portions configuring wedges as seen in gusset type packaging bags or the like, and includes bags with the forms as shown in FIGS. 2B and 2C. FIG. 2B is a two-fold seal type packaging bag and FIG. 2C is a three-fold seal type packaging bag.

The amount of the ink 1 accommodated in the ink pack 10 is set such that the volume of the ink 1 becomes 90% or less with respect to the capacity of the ink pack 10. Filling a further 10% or more is possible; however, because this significantly impairs the fluidity (the convection of the inner portion of the ink pack 10) of the ink 1 when rocking is performed, some room is left. Here, an inert gas or the like is filled in the capacity of the room portion, and a method of further increasing the fluidity of the ink 1 may be adopted.

Figure 3A:
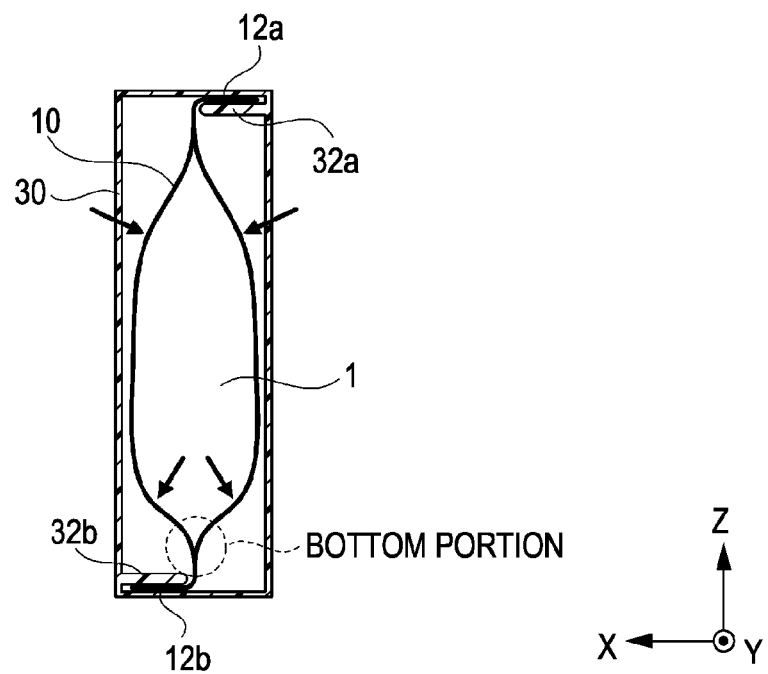
FIG. 3A is a cross-sectional view showing a state in which an ink pack is accommodated in a holder and FIG. 3B is a cross-sectional view showing an example of a gusset type packaging bag.

FIG. 3A is a cross-sectional view showing a state where the ink pack 10 is accommodated in the holder 30.

A three-fold seal type packaging bag shown in FIG. 2C is used in the ink pack 10. The seal portions 12a and 12b at the top and bottom are folded so as to be in opposite directions with respect to the substantially horizontal direction respectively, and inserted into and held in slit portions formed by presser plates 32a and 32b of the holder 30 to be described later.

Figure 3B:
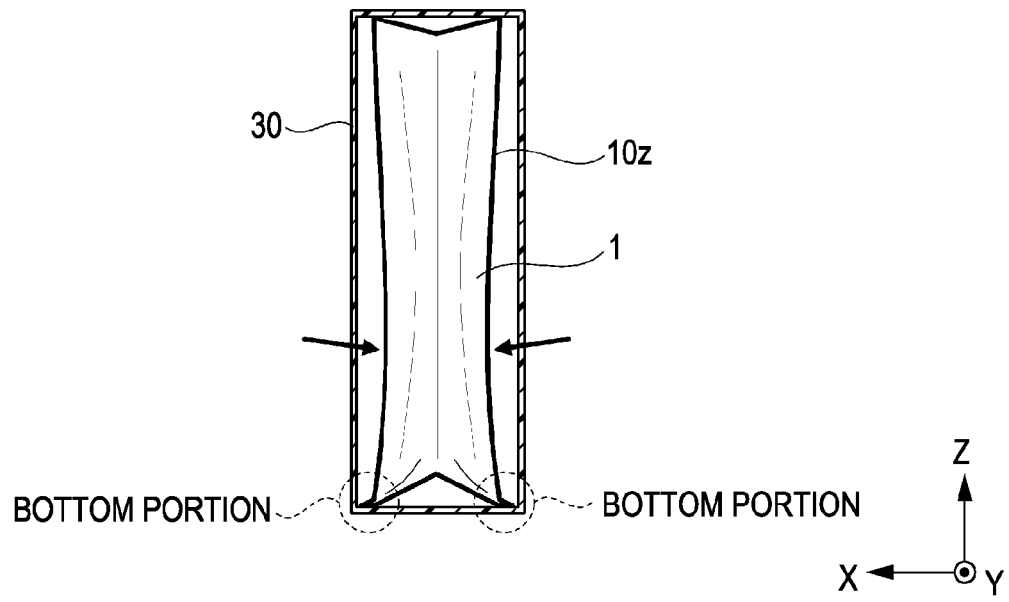

FIG. 3B is a cross-sectional view showing an example of a gusset type packaging bag 10z.

As shown in FIG. 3B, in a case where the gusset type packaging bag is used, as the ink 1 in the inner portion is consumed, the gusset type packaging bag 10z tends to deform in the direction of the arrow shown in FIG. 3B. In such a case, particularly in cases such as where the bottom portion of the gusset type packaging bag 10z is on the bottom portion of the holder 30, there are cases where the portions configuring wedges at the bottom portion of the gusset type packaging bag 10z as in the portions surrounded by the dashed lines in FIG. 3B are folded, and dispersed particles enter into the overlapped gap portions.

In contrast, as shown in FIG. 3A, in the case of the ink pack 10, deformation tends to occur in the direction of the arrow shown in FIG. 3A as the ink 1 of the inner portion is consumed. Since a valley portion due to the seal portion of the bottom portion instead moves in a spreading out direction according to this deformation, the entering of the dispersed particles into the gap portion is reduced. Accordingly, the accommodation bag is preferably the pillow type packaging bag rather than the gusset type packaging bag.

The flow channel member 20, is a block body molded with resin, and, as shown in FIG. 1, is bonded such that an opening portion 11 of the ink pack 10 is sealed, and is fixed to an opening portion 31 of the holder 30 in a state where the ink pack 10 is accommodated in the holder 30. The flow channel member 20 provides a flow channel (not shown) for filling the ink 1 in the ink pack 10; however, after the ink 1 is filled, the flow channel member 20 is sealed.

Figure 4:
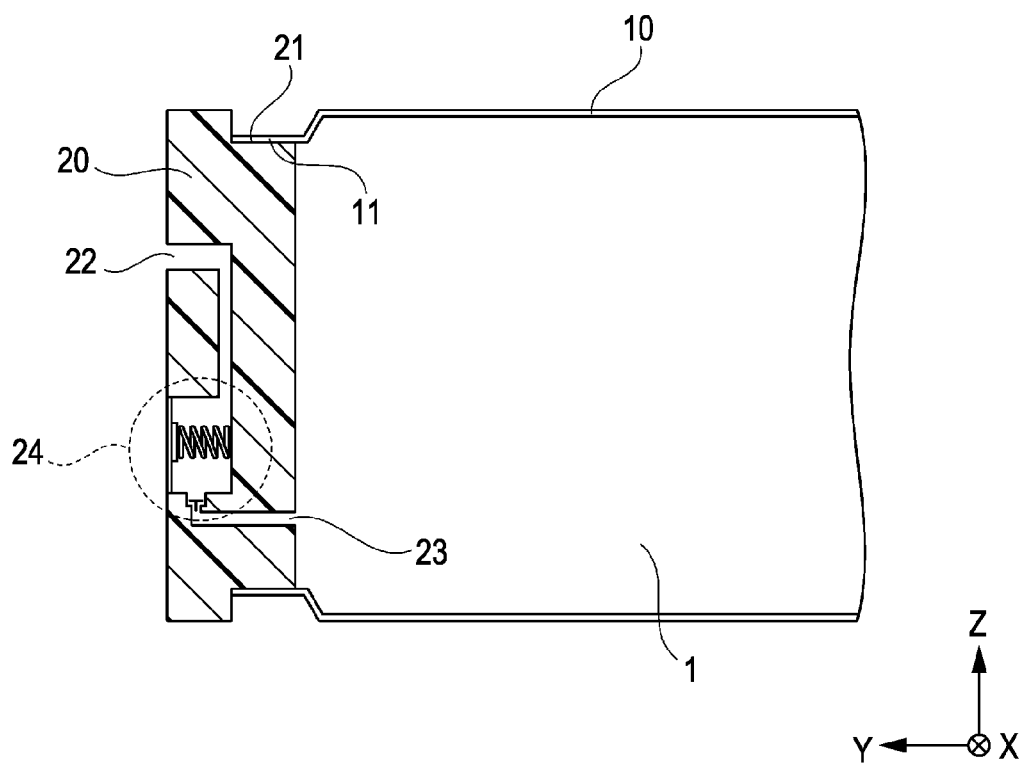
FIG. 4 is a side cross-sectional view showing a configuration of a flow channel member.

FIG. 4 is a side cross-sectional view showing the configuration of the flow channel member 20.

As shown in FIG. 4, the flow channel member 20 is provided with a suction port 23 as a liquid suction port in which the ink 1 is introduced from the ink pack 10, and a discharge port 22 as a liquid discharge port from which the ink 1 is derived. In a case where the ink cartridge 100 is mounted on the ink jet type recording apparatus, the ink 1 is supplied to the ink jet type recording apparatus through a flow channel from the suction port 23 to the discharge port 22. In addition, between the suction port 23 and the discharge port 22, an ink remaining amount detecting mechanism 24 including a check valve is provided.

In a case where the ink cartridge 100 is mounted on the ink jet type recording apparatus installed in an activatable state, in other words, in a case where installation is performed to be substantially horizontal, as shown in FIG. 4, the flow channel member 20 is preferably configured such that the height of the suction port 23 reaches the lowest position in the vertical direction with respect to the height of the discharge port 22. Specifically, the discharge port 22 and the suction port 23 are opened at a position of approximately two thirds and a position of approximately one fifth of the height of the flow channel member 20 respectively. Here, the height at which the suction port 23 is positioned is preferably installed at a height of half or less of the height (height of half or less of the width of the ink pack 10) of the ink pack 10.

Next, the holder 30 will be described with reference to FIG. 1.

The holder 30 is a box made of resin having a substantially rectangular parallelepiped shape in which a face to which the flow channel member 20 is attached is opened, and is configured by five faces or the like of a top plate 30a, side plates 30b and 30c, a bottom plate 30d, and a back plate 30e. The side plates 30b and 30c configure flat faces of the ink cartridge 100.

In the inner portion of the holder 30, at the upper portion of the side plate 30b, the presser plate 32a having a width of approximately half the top plate 30a is fixed to the top plate 30a to form a slit portion substantially parallel with the top plate 30a. In addition, in the same manner, at the lower portion of the side plate 30c, the presser plate 32b having a width of approximately half of the side plate 30d is fixed to the bottom plate 30d to form a slit portion substantially parallel with the bottom plate 30d.

As shown in FIG. 3, the seal portions 12a and 12b at the top and bottom of the ink pack 10 are inserted in the top and bottom slit portions so as to not fall.

Figure 5A:
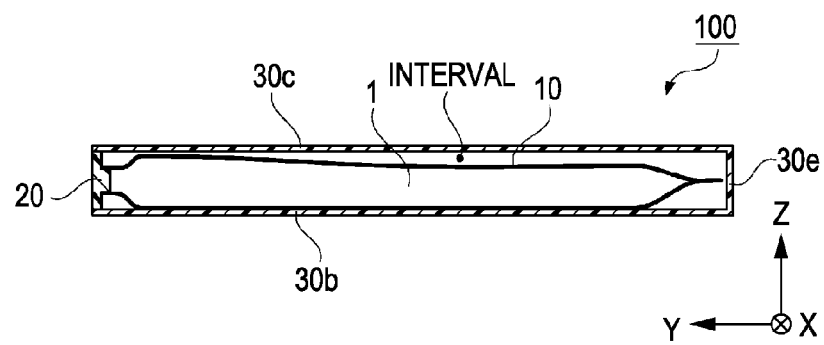
FIG. 5A is a longitudinal direction cross-sectional view of a case where a flat face of the ink cartridge is left to stand horizontally.

FIG. 5A is a longitudinal direction cross-sectional view of the ink cartridge 100 showing an example of a case where a flat face (side plate 30b) of the ink cartridge 100 is left to stand substantially horizontally.

As shown in FIG. 5A, the holder 30 has an inner portion width such that, even in a state where the ink 1 is filled in the ink pack 10 (filling rate: Max 90%), a gap is left between the holder 30 and the ink pack 10. In a case where the ink cartridge 100 is rocked and the ink 1 is stirred, the size of this gap is desirably set to allow sufficient convection of the ink 1.

From experience, it is understood that, in a case of a filling amount of a degree at which the filled ink 1 does not cause swelling in the upper face of the ink pack 10 when left to stand horizontally as shown in FIG. 5A or a degree at which a slight recess is confirmed, the deformation, movement, and the like of the ink pack 10 are easier, and stirring is effectively performed by the rocking of the ink cartridge 100.

In addition, among the five faces of the top plate 30a, the side plates 30b and 30c, the bottom plate 30d, and the back plate 30e, at least one face is preferably not fixed to the ink pack 10 accommodated in the inner portion. Even if there is a gap, in a case where the ink pack 10 is fixed, the convection of the ink 1 is inhibited since the deformation of the ink pack 10 becomes more difficult. Accordingly, in a range in which the ink pack 10 is not excessively deformed and convection is not impaired, it is preferable that at least two or more faces not be fixed.

Here, in the configuration of the ink cartridge 100, there are cases where a film is inserted into a gap portion between the inner wall of the holder 30 and the ink pack 10. In a case where this film is fixed and bonded or adhered to the ink pack 10, this may be a factor inhibiting the movement or deformation of the ink pack 10 in the gap range. Accordingly, even in a case where the film is inserted, it is preferable to provide a gap or the like between the ink pack 10 and the film such that the movement of the ink pack 10 is not inhibited by the film.

Figure 5B:
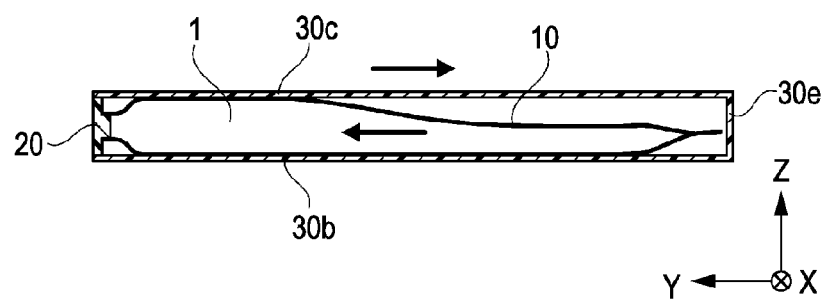
FIGS. 5B and 5C are conceptual views showing convection of the ink along with rocking.
Figure 5C:
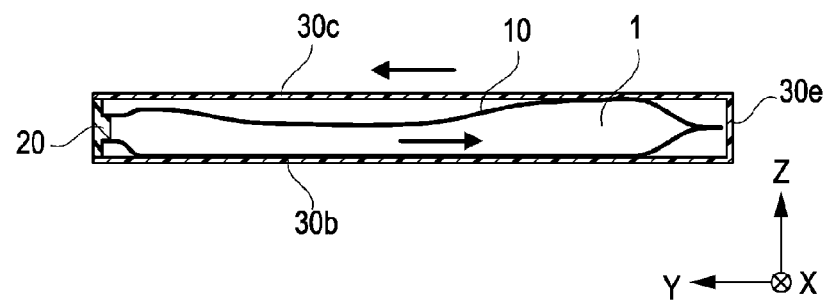

FIGS. 5B and 5C are conceptual views showing a state of convection of the ink 1 along with the rocking of the ink cartridge 100.

The stirring of the ink 1 in the ink cartridge 100 is preferably rocking by making a flat face (side plate 30b or side plate 30c) of the ink cartridge 100 substantially horizontal on the bottom and moving the ink cartridge 100 reciprocally in the longitudinal direction. In FIG. 5B, the ink 1 in the inner portion is relatively moved in the +Y direction by shaking the ink cartridge 100 in the −Y direction, and FIG. 5C shows a state in which the movement is reversed. Due to this movement of the ink 1, the ink 1 undergoes convection in the inner portion of the ink pack 10 and the dispersed particles included in the ink 1 are stirred.

Below, description will be given of specific Examples. In the Examples, the amounts of ink to be filled using two types of ink cartridges (sets of ink packs and cartridge holders) are changed and the effect of the stirring is evaluated in comparison with Comparative Examples.

First, specifications common to the Examples are described below.

Table 1 describes the compositions of the white ink used as the ink 1. The weight of the dispersed particles of the white ink is 78 µg.

TABLE 1

| Component | [%] |
| --- | --- |
| White pigment (titanium dioxide) | 10 |
| Polyester based resin: "KT-8803" manufactured by Unichika Co., Ltd | 3 |
| Polyethylene based wax: "PEM-17" manufactured by Sannopco Co., Ltd. | 1 |
| Surfactant: "BYK348" manufactured by BYK-Chemie Japan Co., Ltd | 1 |
| Silica: (Snowtex XL) manufactured by Nissan Chemical Industries, Ltd | 1 |
| Propylene glycol | 10 |
| 1,2-hexanediol | 3 |
| 2-pyrrolidone | 2 |
| Ion-exchanged water | Remainder |

Here, a dispersion of titanium dioxide used in the white ink was prepared by the following method.

25 parts by mass of a solid acrylic acid/n-butyl acrylate/benzyl methacrylate/styrene copolymer having a glass transition temperature of 40° C., a weight average molecular weight of 10000, and an acid value of 150 mgKOH/g were dissolved in a mixed solution of 75 parts by mass of diethylene glycol diethyl ether, and a polymer dispersing agent solution with a resin solid content of 25 mass % was obtained.

After 19 mass % of diethylene glycol diethyl ether was added to and mixed with 36 mass % of the polymer dispersing agent solution, a resin varnish for titanium dioxide dispersion was prepared, and titanium dioxide (CR-90, alumina-treated silica (alumina/silica 0.5) average particle diameter on a volume basis 300 nm, oil absorption 21 ml/100 g, manufactured by Ishihara Sangyo Kaisha Ltd.) 45 mass % was added thereto and mixed by stirring, grinding was performed in a wet type circulation mill and a titanium dioxide dispersion was obtained.

In the respective Examples and Comparative Examples, after the ink cartridges were left to stand for the above-mentioned specific period and the dispersed particles were deposited, stirring was performed with the method shown below.

The ink cartridge was held horizontally and stirred 50 times in the longitudinal direction of the ink cartridge with a shaking width of approximately 15 cm and 3 reciprocations per second. Thereafter, the ink cartridge was inverted and held horizontally, and again stirred 50 times.

The effects of the stirring were evaluated as follows.

The ink after stirring was extracted from the upper layer thereof while performing separation into amounts of approximately 10% of the respective filling rates using a pump, and set as samples excluding approximately the final remaining 100 ml. Next, 1 g was extracted from each of the samples and the respective absorbances were measured after one thousand-fold dilution. The measurement measured the absorbance (Abs value) at a wavelength of 500 nm of the diluted white ink composition using a spectrophotometer (product name "Spectrophotometer U-3300", manufactured by Hitachi, Ltd.).

The effects of the stirring were evaluated according to the difference (maximum absorbance ratio−minimum absorbance ratio) after calculating the absorbance ratios of the respective samples changed according to the deposition of the white pigment, with the absorbance of an initial state (state where the density of the white pigment (titanium dioxide) was 10%) in which the dispersed particles were sufficiently stirred and dispersed as 100%. A greater difference shows that the stirring was more insufficient.

Absorbance ratio[%]={(absorbance of sample)/(absorbance of initial state)}×100

Determination criteria: A (Good): 0 to less than 5% B (Substantially good): 5% or more to less than +10% C (Insufficient): 10% or more The evaluation results are shown in Table 2.

TABLE 2

| | Filling amount | Filling rate | Maximum absorbance ratio | Minimum absorbance ratio | Difference | Evaluation |
|---|---|---|---|---|---|---|
| Comparative Example 1 | 700 ml | 100% | 126% | 95% | 31% | C |
| Example 1 | 600 ml | 86% | 103% | 100% | 3% | A |
| Example 2 | 500 ml | 71% | 107% | 104% | 3% | A |
| Comparative Example 2 | 700 ml | 100% | 118% | 52% | 76% | C |
| Example 3 | 600 ml | 86% | 100% | 94% | 6% | B |

Examples 1 and 2

Comparative Example 1

White ink was filled in the ink pack 10 (FIG. 3A) in the amounts shown in Table 2, and mounting was performed on the cartridge holder 30. Thereafter, the white pigment was deposited by being left to stand naturally for five months. Thereafter, evaluation was performed by performing the same stirring as in the previously described method.

Example 3

Comparative Example 2

White ink was filled in a gusset type ink pack as in FIG. 3B in the amounts shown in Table 2, and the white pigment was deposited by being left to stand naturally for five months. Thereafter, evaluation was performed by performing the same stirring as in the previously described method.

As described above, according to the liquid container according to the embodiment, it is possible to obtain the following effects.

Since the ratio of the volume of the ink 1 including the dispersed particles with respect to the capacity of the ink pack 10 when the container is used from the initial filling period is 95% or less, in a case where the ink cartridge 100 is rocked before being attached to the ink jet type recording apparatus, or after being detached from the ink jet type recording apparatus, it is possible to easily cause convection of the ink 1 in the inner portion. As a result, it is possible to more effectively disperse the dispersed particles, which tend to be deposited, in the solvent.

Accordingly, even with a sealed liquid container which does not include an air layer in the inner portion, it is possible to perform stirring without providing a stirring ball or the like, and it is possible to provide a liquid container in which costs are further reduced.

In addition, for example, in a case of an ink jet type recording apparatus or the like recording glitter images or images with high brightness, dispersed particles of at least one type or more selected from metal oxides, glitter pigments, and pigments having an average particle diameter of 200 nm or less (more preferably 50 nm or more, 100 nm or less) other than metal oxides and glitter pigments, are preferably used as the dispersed particles in the ink 1. In addition, the weight (specific gravity×volume) of the dispersed particles is preferably 10 μg or more.

Even with an ink cartridge used for such applications, it is possible to perform stirring without providing a stirring ball or the like, and it is possible to provide an ink cartridge in which costs are further reduced.

In addition, the ink pack 10 is preferably a pillow type packaging bag, and, in such a case, since there are no folded portions configuring wedges as seen in gusset type packaging bags or the like, the deposited dispersed particles do not enter into the folded gaps. Accordingly, it is possible to easily disperse the dispersed particles, which tend to be deposited, in the solvent by causing convection of the ink 1.

In addition, in a case where the ink cartridge 100 mounted on the ink jet type recording apparatus installed in an activatable state, in other words, in a case where installation is performed to be substantially horizontal, the height of the suction port 23 provided in the flow channel member 20 is preferably arranged to be at a low position in the vertical direction with respect to the height of the discharge port 22. For example, even in a case where it is necessary to install the height of the discharge port 22 at a high position in a specific range, by installing the height of the suction port 23 at a lower position, it is possible to supply the ink 1 including an appropriate amount of the dispersed particles, which tend to be deposited, to the ink jet type recording apparatus. As a result, the gradual increasing of the density of the dispersed particles remaining in the ink pack 10 is reduced, and it is possible to maintain a more stable density.

In addition, at least in a case where the holder 30 accommodating the ink pack 10 in the inner portion thereof is detached from the ink jet type recording apparatus, it is preferable to have a gap in which the ink pack 10 is capable of moving or deforming in the inner portion of the holder 30. By adopting such a configuration, in a case where the ink cartridge 100 is detached from the ink jet type recording apparatus and rocked, the prevention of the movement of the ink pack 10 is reduced, and it is possible to more easily cause convection in the ink 1 accommodated in the inner portion. As a result, it is possible to more effectively disperse the dispersed particles, which tend to be deposited, in the solvent.

In addition, by configuring the holder 30 having a substantially rectangular parallelepiped shape such that, among the five side surfaces other than the side surface at which the flow channel member 20 is positioned, the ink pack 10 accommodated in the inner portion is preferably not fixed to at least one face, the necessary sufficient deformation of the ink pack 10 is promoted according to the rocking, and it becomes possible to more easily cause convection of the ink 1 accommodated in the inner portion.

Embodiment 2

Next, description will be given of the liquid container according to Embodiment 2. Here, in the description, the same reference numerals will be used for the same constituent parts as Embodiment 1, and repetitive description thereof will be omitted.

Figure 6A:
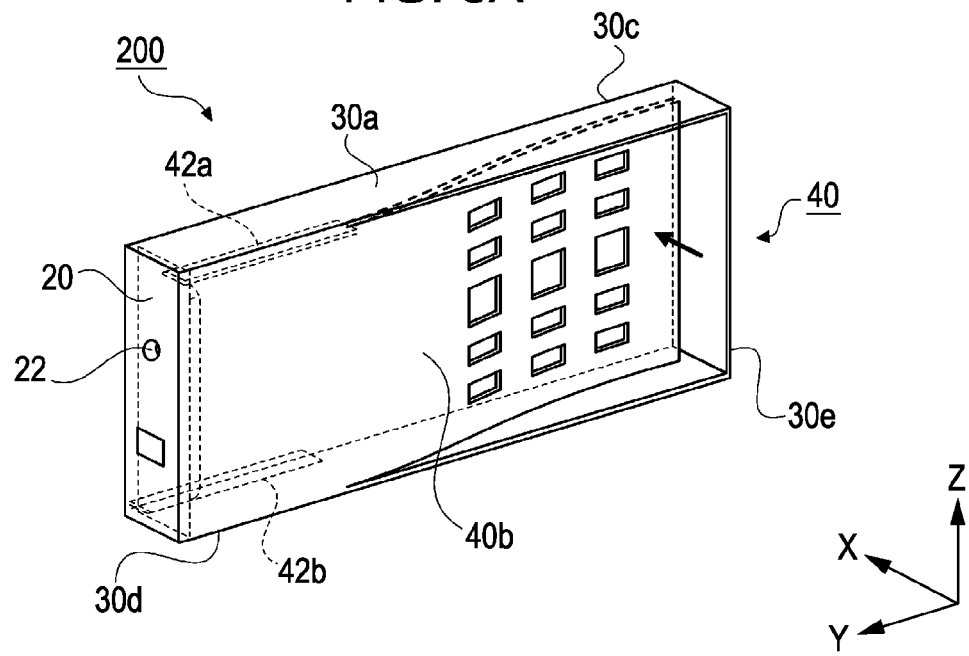
FIG. 6A is an oblique perspective view showing a configuration of an ink cartridge as a liquid container according to Embodiment 2 and FIG. 6B is a cross-sectional view seen from above the same ink cartridge.
Figure 6B:
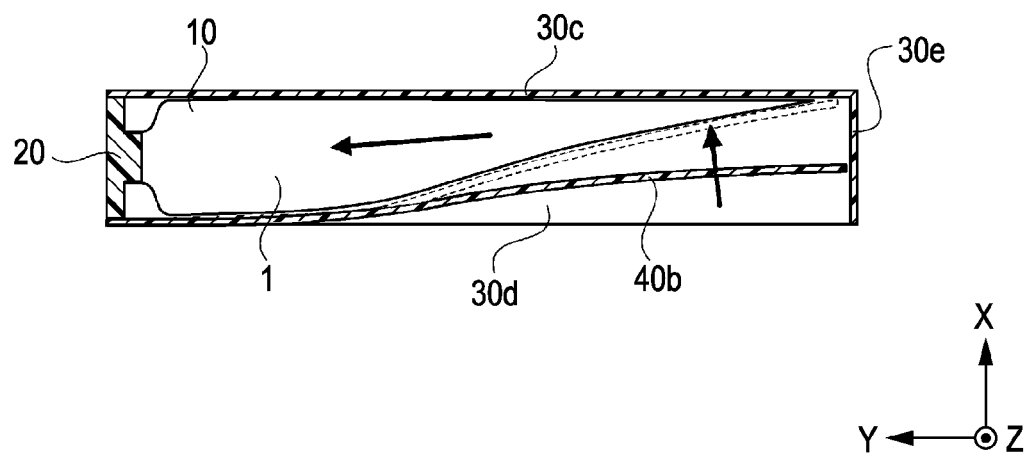

FIG. 6A is an oblique perspective view showing a configuration of an ink cartridge 200 as a liquid container according to Embodiment 2. In addition, FIG. 6B is a cross-sectional view seen from above the ink cartridge 200.

Embodiment 2 is further provided with a pressing mechanism pressing the ink pack 10 and moving the ink 1 in the direction of the region where the flow channel member 20 is provided.

The ink cartridge 200 is configured by the ink 1, the ink pack 10, the flow channel member 20, a holder 40, and the like. Except that the configuration of the holder 40 is different from that of the holder 30, the configuration is the same as the ink cartridge 100.

The holder 40 is configured by five faces of the top plate 30*a*, side plates 40*b* and 30*c*, the bottom plate 30*d*, and the back plate 30*e*, presser plates 42*a* and 42*b*, and the like. In other words, except for the side plate 40*b* and the presser plates 42*a* and 42*b*, the configuration is the same as the holder 30.

Approximately one third of the side plate 40*b* in the +Y axis direction is fixed to the top plate 30*a* and the bottom plate 30*d*, and the other two thirds in the −Y axis direction are structured so as to enter into the inner portion of the holder 40 in the −Y axis direction as a cover. In addition, the side plate 40*b* is a plate-shaped body having a spring property and has a shape pressing the region of the −Y axis direction of the side plate 30*c* from the inner side of the holder 40 in a state where external force is not applied thereto. In other words, in a case where the side plate 40*b* is at least mounted on the ink jet type recording apparatus, the side plate 40*b* configures a pressing mechanism which presses the ink pack 10 accommodated in the inner portion of the holder 40, and which performs pushing in the direction (+Y axis direction) of the region in which the flow channel member 20 is provided as shown by the arrow in FIG. 6B so as to move the ink 1.

In addition, the presser plates 42*a* and 42*b* are fixed to the +Y axis side of the side plates 42*b* and 30*c* at a length of approximately one third of the presser plates 32*a* and 32*b*, form slits with the top plate 30*a* and the bottom plate 30*d*, and hold approximately one third of the seal portions of the upper and lower portions of the ink pack 10.

Here, since the pressing mechanism according to the side plate 40*b* presses the side surface of the ink pack 10, there are cases where interference is caused when the ink cartridge 200 is rocked and the ink 1 is stirred. Accordingly, during the stirring, rocking is preferably performed while the side plate 40*b* is pulled up from the inner portion (in the −X direction in FIGS. 6A and 6B) of the holder 40 and held as is.

According to the liquid container according to the embodiment, in addition to the effects of Embodiment 1, it is possible to obtain the following effects.

By providing the pressing mechanism according to the side plate 40*b*, as the ink jet type recording apparatus consumes the ink 1 and the ink 1 in the inner portion of the ink pack 10 is reduced, it is possible to move the remaining ink 1 in the direction of the region in which the flow channel member 20 is provided. To paraphrase, as the ink 1 is suctioned by the ink jet type recording apparatus, the ink pack 10 is gradually pressed from the −Y direction, and is squashed to be flat so as to be pinched without deforming into a distorted shape. As a result, the dispersed particles, which tend to be deposited, remaining in the portion separated from the region in which the flow channel member 20 is provided inside the ink pack 10 are reduced. In addition, in a case where the ink cartridge 200 is detached from the ink jet type recording apparatus and stirring is performed by rocking the ink cartridge 200, since the dispersed particles are not deposited across a wide range, it is possible to more easily disperse the deposited dispersed particles.

Embodiment 3

Next, as Embodiment 3, description will be given of a liquid container set of the embodiment. Here, in the description, the same reference numerals will be used for the same constituent parts as the above-mentioned embodiments, and repetitive description thereof will be omitted.

The liquid container set in the embodiment is an ink cartridge set formed of the ink cartridge 100 or the ink cartridge 200 and an ink cartridge 300 (not shown) as a color liquid container.

The ink cartridge 300 is provided with an ink 2 as a colored liquid which does not include the dispersed particles according to Embodiments 1 and 2, and an ink pack 20 accommodating the ink 2, is characterized in that the ratio of the volume of the ink 2 with respect to the capacity of the ink pack 20 is higher than the ratio of the volume of the ink 1 with respect to the capacity of the ink pack 10.

Specifically, the amount of the ink 1 accommodated in the ink pack 10 is set such that the volume of the ink 1 is 90% or less with respect to the capacity of the ink pack 10; however, the ratio of the volume of the ink 2 with respect to the capacity of the ink pack 20 is preferably set to an amount exceeding 90%. Since the ink 2 does not include the dispersed particles according to Embodiments 1 and 2, there is no need for concern about deposition compared with the ink 1. Accordingly, there is no need to improve the convection property when stirring by rocking until the filling rate goes down.

Here, the configuration of the ink pack 20 may be the same as that of the ink pack 10. In addition, the flow channel member configuring the discharge portion provided in the ink cartridge 300 may be the same as the flow channel member 20.

In the ink 2, the dyes or pigments shown below are included as coloring materials.

Examples of the pigments include pigments with an average particle diameter of 200 nm or less among the same types of pigments described in Embodiments 1 and 2.

As the dyes, it is possible to use various types of dyes used in normal ink jet type recording apparatuses such as direct dyes, acid dyes, food dyes, basic dyes, reactive dyes, disperse dyes, vat dyes, soluble vat dyes, and reactive disperse dyes.

Examples of yellow dyes include C. I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, 165, C. I. Direct Yellow 1, 8, 11, 12, 24, 26, 27, 33, 39, 44, 50, 58, 85, 86, 87, 88, 89, 98, 110, 132, 142, 144, C. I. Reactive Yellow 1, 2, 3, 4, 6, 7, 11, 12, 13, 14, 15, 16, 17, 18, 22, 23, 24, 25, 26, 27, 37, 42, C. I. Food Yellow 3, 4, C. I. Solvent Yellow 15, 19, 21, 30, 109, and the like.

Examples of magenta dyes include C. I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, 322, C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, C. I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, C. I. Sorbitan Rise Red 1, C. I. Food Red 7, 9, 14, and the like.

Examples of the cyan dyes include C. I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, 249, C. I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249, C. I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, C. I. Sorbitan Rise Vat Blue 1, 5, 41, C. I. Vat Blue, 4, 29, 60, C. I. Food Blue 1, 2, C. I. Basic Blue 9, 25, 28, 29, 44, and the like.

As described above, by further increasing the filling rate of the ink cartridge 300, it is possible to further reduce the replacement frequency of the ink cartridge 300.

In addition, the weight of the ink 1 including the dispersed particles tends to be heavier than the weight of the same amount of the ink 2 due to the density of the dispersed particles being high; however, by increasing the filling rate of the ink 2, it becomes possible to achieve a weight balance between the ink cartridge 100 or the ink cartridge 200 and the ink cartridge 300.

Here, the invention is not limited to the embodiments described above, and it is possible to add various modifications, improvements, or the like to the above-described embodiments. Modification Examples are described below. Here, the same reference numerals will be used for the same constituent parts as the above-mentioned embodiments, and repetitive description thereof will be omitted.

Ink Jet Type Recording Apparatus

By utilizing the liquid container exemplified in the above-described embodiments, the ink jet type recording apparatus can be provided as a more effective recording apparatus having excellent characteristics. Specifically, when inks in which dispersed particles of a pigment or the like are uniformly dispersed and mixed in a solvent are left to stand for a long period of time, there is a tendency for the dispersed particles with a high density (which are heavy) in comparison with the solvent to be deposited. The deposition of the dispersed particles leads to a decrease in recording quality, such as ejection defects or the like due to color unevenness during recording or ink clogging in the ink jet type recording apparatus. Therefore, in order to re-disperse the deposited dispersed particles in the inner portion of the liquid container, methods such as shaking and stirring the liquid container have been adopted. By utilizing the above-described liquid container, in a case where the liquid container is rocked before performing attachment to the ink jet type recording apparatus or after performing detachment from the ink jet type recording apparatus, it is possible to easily cause convection in the ink in the inner portion. As a result, it is possible to more effectively disperse the dispersed particles, which tend to be deposited, in the solvent and it is possible to perform recording without causing a decrease in recording quality, such as ejection defects or the like due to color unevenness during recording or ink clogging in the ink jet type recording apparatus.

Modification Example 1

Figure 7A:
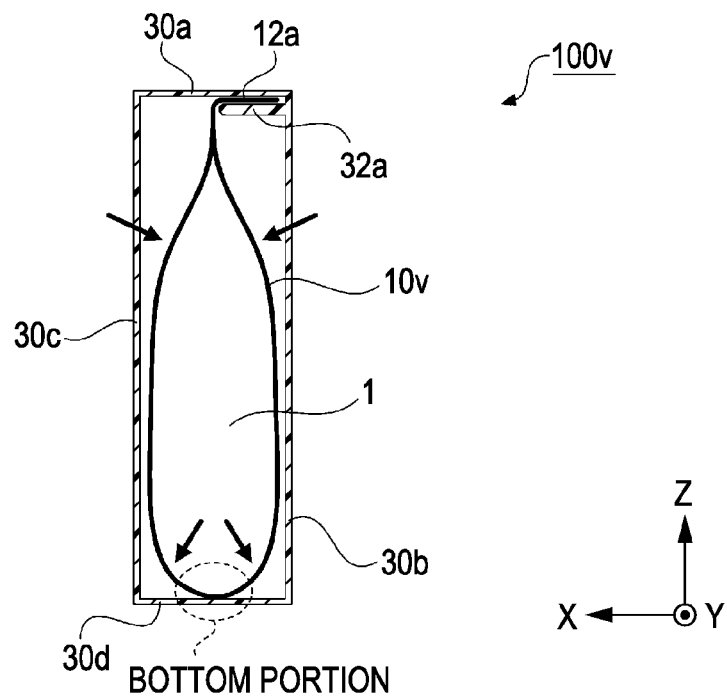
FIGS. 7A and 7B are cross-sectional views showing a configuration of an ink cartridge as a liquid container according to Modification Examples 1 and 2.

FIG. 7A is a cross-sectional view showing the configuration of an ink cartridge 100v as a liquid container according to the Modification Example 1.

In Embodiment 1, as shown in FIG. 3A, description has been given that a three-fold seal type packaging bag shown in FIG. 2C is used in the ink pack 10 and the seal portions 12a and 12b at the top and bottom are inserted and held in slit portions formed by the presser plates 32a and 32b of the holder 30; however, the invention is not limited to this configuration. As shown in FIG. 7A, the configuration may be one in which the two-fold seal type packaging bag shown in FIG. 2B is used, the seal portion in the upper direction is inserted and held in a slit portion formed by the presser plate 32a, and the bottom portion does not have a seal portion.

According to this configuration, as shown in FIG. 7A, since the bottom portion does not have a valley portion due to the seal, the dispersed particles do not enter into the gap portion.

In addition, since deformation of the ink pack 10 tends to occur in the direction of the arrow shown in FIG. 7A as the ink 1 of the inner portion is consumed, the bottom portion becomes flatter, and there is also no generation of folding or the like which is a concern in the gusset type packaging bag 10z (FIG. 3B).

In addition, since the lower end of an ink pack 10v adopts a configuration which is not held in the bottom portion of a holder 30c, during the stirring, the ink pack 10v is more easily deformed, and convection of the ink 1 is more easily caused.

Accordingly, according to the ink cartridge 100v as the liquid container according to the Modification Example, it is possible to provide a liquid container in which the deposited dispersed particles are more easily stirred.

Modification Example 2

Figure 7B:
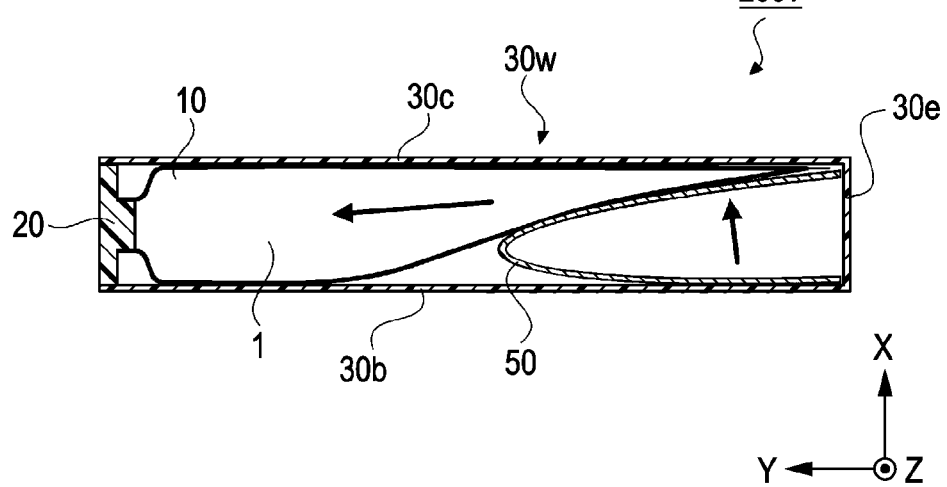

FIG. 7B is an oblique perspective view showing the configuration of an ink cartridge 200v as a liquid container according to Modification Example 2.

In Embodiment 2, as shown in FIGS. 6A and 6B, description has been given that the side plate 40b configures a pressing mechanism which presses the ink pack 10 accommodated in the inner portion of the holder 40, and which performs pushing in the direction (+Y axis direction) of the region in which the flow channel member 20 is provided as shown by the arrow in FIG. 6B so as to move the ink 1; however, the invention is not limited to this configuration. As shown in FIG. 7B, a configuration may be adopted in which a spring plate 50 is arranged in the inner portion of a holder 30w. In addition, this spring plate 50 may be configured to be arranged on both side surfaces as well as just one side surface of the ink pack 10.

Even with the configuration of the ink cartridge 200v as the liquid container according to the Modification Example, it is possible to obtain the same effect as in Embodiment 2.

Modification Example 3

In Embodiment 2, as shown in FIGS. 6A and 6B, description has been given that the side plate 40b configures a pressing mechanism which presses the ink pack 10 accommodated in the inner portion of the holder 40, and which performs pushing in the direction (+Y axis direction) of the region in which the flow channel member 20 is provided as shown by the arrow in FIG. 6B so as to move the ink 1; however, the invention is not limited to this configuration. A configuration may be adopted in which a side plate 40c (not shown) is set by setting a side plate 30c as a plate-shaped body having a spring property in the same manner as the side plate 40b and configuring this side plate 30c to oppose the side plate 40b, and in which the ink pack 10 is pressed so as to be pinched by the side plate 40b and the side plate 40c. Even with the configuration of Modification Example 3, it is possible to obtain the same effect as in Embodiment 2.

What is claimed is:

1. A liquid container detachably mounted on a liquid consuming apparatus, comprising:
   a holder that has a plurality inner surfaces;
   a liquid including dispersed particles and a solvent in which the dispersed particles are dispersed;
   an accommodation bag that is provided inside of the holder, that has discharge, top, bottom, first side, second side and third side portions and that accommodates the liquid, and the discharge portion discharging the liquid, the discharge, top, bottom, first side, second side and third side portions of the accommodation bag being respectively located adjacent to first through sixth inner surfaces of the plurality of inner surfaces;
   a first pressure plate that is provided next to the second inner surface, that extends along the second inner surface and that is spaced apart from the second inner surface with a first gap; and
   a second pressure plate that is provided next to the third inner surface, that extends along the third inner surface and that is spaced apart from the third inner surface with a second gap, wherein
   a ratio of a volume of the liquid with respect to a capacity of the accommodation bag is between 70% or more and 95% or less before the liquid is discharged from the discharge portion,
   the dispersed particles are a glitter pigment or metal oxide, wherein
      the glitter pigment is selected from the group consisting of aluminum, silver, gold, platinum, nickel, chromium, tin, zinc, indium, titanium, and copper, and
      the metal oxide is selected from the group consisting of titanium dioxide, zinc oxide, alumina, magnesium oxide, and zirconium oxide,
   the discharge portion of the accommodation bag is fixed to the first inner surface,
   the top portion of the accommodation bag is inserted into the first gap so as to fixed between the second inner surface and the first pressure plate,
   the bottom portion of the accommodation bag is inserted into the second gap so as to fixed between the third inner surface and the second pressure plate, and
   at least one of the first through third side portions is movable with respect to the plurality of inner surfaces.

2. The liquid container according to claim 1, wherein the accommodation bag is a pillow type packaging bag.

3. A liquid container set comprising:
   the liquid container according to claim 2; and
   a color liquid container,
   wherein the color liquid container is provided with a color liquid which does not include the dispersed particles and a color liquid accommodation bag accommodating the color liquid, and
   wherein a ratio of a volume of the color liquid with respect to a capacity of the color liquid accommodation bag is higher than a ratio of a volume of the liquid with respect to a capacity of the accommodation bag.

4. An ink jet type recording apparatus comprising:
   the liquid container according to claim 2.

5. The liquid container according to claim 1, wherein, in a case of the accommodation bag being mounted on at least the liquid consuming apparatus, the liquid container further comprises a pressing mechanism which presses the accommodation bag and moves the liquid in a direction of a region where the discharge portion is provided.

6. A liquid container set comprising:
   the liquid container according to claim 5; and
   a color liquid container,
   wherein the color liquid container is provided with a color liquid which does not include the dispersed particles and a color liquid accommodation bag accommodating the color liquid, and
   wherein a ratio of a volume of the color liquid with respect to a capacity of the color liquid accommodation bag is higher than a ratio of a volume of the liquid with respect to a capacity of the accommodation bag.

7. An ink jet type recording apparatus comprising:
   the liquid container according to claim 5.

8. The liquid container according to claim 1,
   wherein the discharge portion is provided with a liquid suction port through which liquid is introduced from the accommodation bag, and a liquid discharge port from which the introduced liquid is derived, and
   wherein, in a case of being mounted on the liquid consuming apparatus installed in an activatable state, a height of the liquid suction port is arranged to be at a lower position in a vertical direction than a height of the liquid discharge port.

9. A liquid container set comprising:
   the liquid container according to claim 8; and
   a color liquid container,
   wherein the color liquid container is provided with a color liquid which does not include the dispersed particles and a color liquid accommodation bag accommodating the color liquid, and
   wherein a ratio of a volume of the color liquid with respect to a capacity of the color liquid accommodation bag is higher than a ratio of a volume of the liquid with respect to a capacity of the accommodation bag.

10. An ink jet type recording apparatus comprising:
    the liquid container according to claim 8.

11. The liquid container according to claim 1, wherein the holder has a third gap between at least one of the plurality of inner surfaces and the accommodation bag so that the accommodation bag is capable of moving or deforming in the holder when the holder is detached from the liquid consuming apparatus.

12. A liquid container set comprising:
    the liquid container according to claim 11; and
    a color liquid container, wherein the color liquid container is provided with a color liquid which does not include the dispersed particles and a color liquid accommodation bag accommodating the color liquid, and wherein a ratio of a volume of the color liquid with respect to a capacity of the color liquid accommodation bag is higher than a ratio of a volume of the liquid with respect to a capacity of the accommodation bag.

13. An ink jet type recording apparatus comprising:
the liquid container according to claim 11.

14. An ink jet type recording apparatus comprising:
the liquid container according to claim 11.

15. The liquid container according to claim 1, wherein the dispersed particles are metal oxide and the solvent is water.

16. The liquid container according to claim 15, wherein the metal oxide is titanium dioxide.

17. The liquid container according to claim 1, wherein
the solvent comprises at least selected from the group consisting of water, 1,2-hexanediol, 2-pyrrolidone, and propylene glycol.

18. A liquid container set comprising:
a holder that has a plurality of inner surfaces;
a liquid that includes dispersed particles and a solvent in which the dispersed particles are dispersed;
an accommodation bag that is provided inside of the holder, that has discharge, top, bottom, first side, second side and third side portions and that accommodates the liquid, and the discharge portion discharging the liquid, the discharge, top, bottom, first side, second side and third side portions of the accommodation bag being respectively located adjacent to first through sixth inner surfaces of the plurality of inner surfaces;
a first pressure plate that is provided next to the second inner surface, that extends along the second inner surface and that is spaced apart from the second inner surface with a first gap;
a second pressure plate that is provided next to the third inner surface, that extends along the third inner surface and that is spaced apart from the third inner surface with a second gap;
a color liquid that does not include the dispersed particles; and
a color accommodation bag accommodating the color liquid and provided with a color discharge portion discharging the color liquid, wherein
the dispersed particles are a glitter pigment or metal oxide,
a ratio of a volume of the liquid with respect to a capacity of the accommodation bag is between 70% or more and 90% or less before the liquid is discharged from the discharge portion,
a ratio of a volume of the color liquid with respect to a capacity of the color liquid accommodation bag is more than 90% before the color liquid is discharged from the color discharge portion,
the discharge portion of the accommodation bag is fixed to the first inner surface,
the top portion of the accommodation bag is inserted into the first gap so as to fixed between the second inner surface and the first pressure plate,
the bottom portion of the accommodation bag is inserted into the second gap so as to fixed between the third inner surface and the second pressure plate, and
at least one of the first through third side portions is movable with respect to the plurality of inner surfaces.

19. An ink jet type recording apparatus comprising:
the liquid container set according to claim 18.

20. The liquid container according to claim 18, wherein
the glitter pigment is selected from the group consisting of aluminum, silver, gold, platinum, nickel, chromium, tin, zinc, indium, titanium, and copper, and
the metal oxide is selected from the group consisting of titanium dioxide, zinc oxide, alumina, magnesium oxide, and zirconium oxide.

21. The liquid container according to claim 20, wherein
the solvent comprises at least selected from the group consisting of water, 1,2-hexanediol, 2-pyrrolidone, and propylene glycol.

* * * * *